United States Patent [19]

Davis, Jr.

[11] 4,125,781

[45] Nov. 14, 1978

[54] CHRISTMAS TREE LIGHTING CONTROL

[76] Inventor: George B. Davis, Jr., 7512 Marbury Rd., Bethesda, Md. 20034

[21] Appl. No.: 750,404

[22] Filed: Dec. 14, 1976

Related U.S. Application Data

[63] Continuation-in-part of Ser. No. 637,025, Dec. 12, 1975, Pat. No. 4,057,735.

[51] Int. Cl.[2] .................................................. H02J 3/00

[52] U.S. Cl. .......................................... 307/11; 307/31; 315/185 S; 338/89

[58] Field of Search ........................ 338/89; 307/11, 31; 315/185 S

[56] References Cited

FOREIGN PATENT DOCUMENTS 1,335,709 10/1973 United Kingdom ...................... 338/89

*Primary Examiner*—Robert K. Schaefer
*Assistant Examiner*—Eugene S. Indyk

[57] ABSTRACT

This invention relates generally to ornamental lighting controls and particularly to a lighting control for Christmas tree lighting having preferably at least four duty cycle outputs and wherein the duty cycle pattern of each output differs, with respect to a predetermined time interval, from the duty cycle pattern of each of the other outputs of the control thereby to produce, in a plurality of ornamental lighting strings respectively connected to the outputs of the control, a coordinated condition of continuously changing light intensities between strings and that occur in predetermined sequential time differing order to result in an overall lighting effect totally unobtainable by any other form of light controlling apparatus.

20 Claims, 7 Drawing Figures

FIG. 1
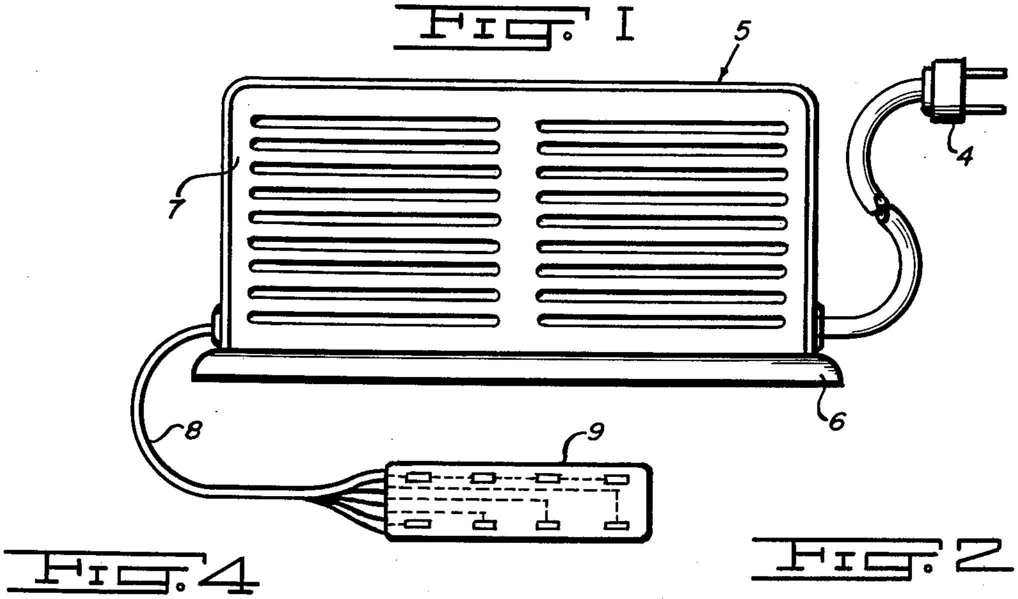
FIG. 4
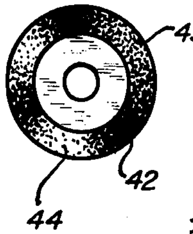
FIG. 2
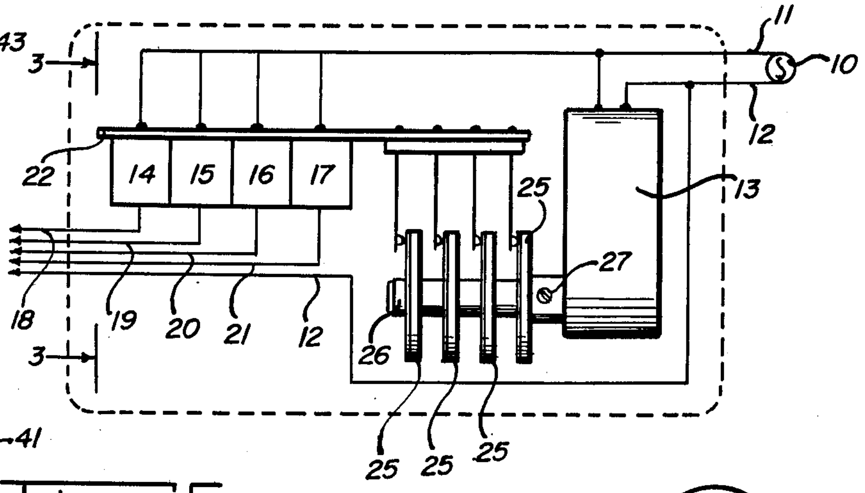
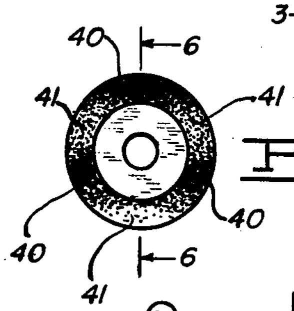
FIG. 5
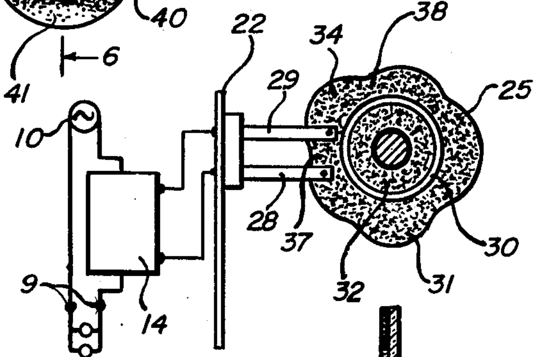
FIG. 3
FIG. 6
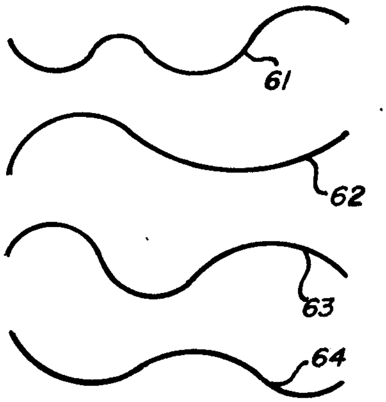
FIG. 7

CHRISTMAS TREE LIGHTING CONTROL

This application is a continuation in part of now pending application Ser. No. 637,025 filed Dec. 12, 1975 now U.S. Pat. No. 4,057,735.

This invention relates generally to ornamental lighting controls and more specifically to such a control wherein a plurality of lighting strings, such as used in Christmas tree lighting are caused to vary individually in light output intensity and in predetermined time differing coordinated sequence to effect an overall light intensity output from the tree that remains substantially constant during such light intensity changes to produce a soft, pleasing, shimmering of all the tree lights, restful to observe and highly in contrast to the annoying effect produced by the conventional flasher or by individually controlled lighting strings that invariably reach a state of synchronization to produce a similar type "tree on" "tree off" condition.

It is an object of the present invention to provide a decorative lighting control that includes a plurality of duty cycle units having respectively variable duty cycle outputs to which may be respectively connected strings of ornamental lights, the control being operative to effect continuous coordinated changes in the duty cycle output of each of the duty cycle units with the duty cycle output pattern of each unit varying, with respect to a predetermined time interval, from the duty cycle output pattern of each of the other units of the control to produce, in respectively connected lighting strings, a coordination of lighting effects unobtainable by any other form of lighting control apparatus.

A further object is to provide a lighting control that includes a plurality of solid state duty cycle units with the duty cycle output pattern of each unit being varied, with respect to each other, by means of commonly driven resistor disks of multiple resistance values that operate to control simultaneously but in differing order the gaiting or triggering circuit of each unit with the duty cycle output pattern of the unit being predetermined by the selected configuration and/or positioning of these resistor disks as driven by a common drive source.

A still further object is to provide an ornamental lighting control primarily for Christmas tree lighting that includes a plurality of solid state duty cycle units with each unit having a variable duty cycle output and with the duty cycle output pattern of each unit so programmed with respect to the duty cycle output pattern of each of the other units of the control as to effect, with respect to a predetermined time interval, differing output patterns between units and that, as applied to respectively connected Christmas tree lighting strings, effect a condition of continuously changing light output intensities that will remain overlapping in nature and serves to maintain a substantially uniform overall lighting level throughout the tree that appears to an observer as a restful shimmering of all the tree lights.

A still further object is to provide an ornamental lighting control that is rugged in structure, reliable and simple in operation, inexpensive to manufacture yet capable of handling high current loads.

Other objects and advantages will become apparent when referring to the accompanying description and drawings wherein:

FIG. 1 is a plan view in elevation of the assembled lighting control.

FIG. 2 is a plan view partly in elevation and partly in schematic of the device of the invention as contained within the device of FIG. 1.

FIG. 3 is a cross sectional view along section 3—3 of FIG. 2 and showing the relation of the spring contact fingers with respect to the resistance disk and as they connect with the duty cycle unit of the device.

FIG. 4 is a plan view in elevation of an alternate form of the resistance disk.

FIG. 5 shows another alternate form of the resistance disk as may be used in the control.

FIG. 6 is a view in cross-section of the disk of FIG. 5 as taken along 6—6.

FIG. 7 shows an example of the varying duty cycle output patterns as may be produced as one operating cycle of the device.

Referring now to the drawings and more particularly to FIG. 1 thereof wherein is shown the assembled device of the present invention as will be generally designated 5 and to which may be connected strings of Christmas tree lights with the lights being either of the parallel or series wired types. The assembly 5 includes a mounting base 6 to which the perforated cover 7 is attached and wherein is inclosed the working mechanism of the device. The connector 4 and power supply cord provides means for electrically connecting the device to a conventional 110 volt AC power supply source.

As shown extending from the opposite end of the cover 7 is a multiple conductor lead 8 to which is molded a multiple outlet connector 9 into which in use, strings of ornamental or Christmas lights may be plugged. This conductor 8 may be of any length desired, preferably sufficiently long, as in the case of Christmas tree lighting, to extend well up into the tree for easy access to the lighting strings while allowing the control to rest beneath the tree or possibly some convenient distance away.

With the cover 7 removed, the arrangement of the components of the control are shown to advantage in FIG. 2 wherein is displayed in schematic, the circuitry of the device. Current from the AC source 10 is shown as being supplied by the conductor means 11 and 12 to the motor 13 and solid state duty cycle units 14, 15, 16, and 17 of the control. From each of the duty cycle units extend their respective variable duty cycle output leads 18, 19, 20, and 21 to connect, along with the AC supply conductor 12, FIG. 1, with the terminals of the connector 9 as shown and into which may be plugged in service, the various lighting strings to be controlled.

These duty cycle units 14, 15, 16, and 17 are herein shown in schematic block for the reason that such solid state duty cycle unit assemblies are well known in the electronic art and may be variously constructed to generally include an SCR or DIAC and TRIAC combination or similar such operating electronic components. The requirement being with the present device is that each duty cycle unit shall include a resistor controlled gaiting or triggering circuit and wherein the resistance value of the gaiting circuit resistor determines the duty cycle rate of the unit and as applied to its duty cycle output.

Each of the duty cycle units are shown as mounted upon a conventionally constructed circuit board 22 that serves to respectively connect within the gaiting circuit of each unit its controlling of gaiting circuit resistor which is shown in FIG. 1 as resistor disks 25. These disks 25 are mounted commonly on a motor shaft extension 26 secured to the motor shaft as by the set screw 27. Operation of the motor, by connecting the control to a power source, effects the rotation of these disks against their respectively engaging contact pairs 28 and 29 of which the arrangement thereof, with respect to the disks, is shown to advantage in FIG. 3. Each of these contacts pairs 28 and 29 are respectively connected in and form an electrical part of each gaiting circuit of each duty cycle unit 14, 15, 16 and 17 and which in operation, controls the duty cycle output rate of the unit by selectively controlling the resistance value of the gating circuit resistor, and which in the present device is the disks 25.

The resistor disks 25 are preferably formed by being punched from an insulating strip that has previously been coated with a suitable resistance material sprayed or otherwise uniformly deposited over the surface of the strip.

Inwardly spaced from the irregular outer edge of the disk is a groove 30 that has been cut through the resistance coating upon the disk and into the plastic or insulating backing plate portion thereof. This groove serves to electrically isolate the used or outer resistance portion 31 of the disk from the inner or unused portion 32.

As apparent, the outer edge of the disk is of varying configuration consequently making the outer or used resistance portion of the disk of differing widths a differing positions about its surface. The configuration of the disk may vary between disk or may be similar in configuration but differently positioned with respect to each other as mounted upon the motor shaft extension 26 as shown. As the control is put in operation by connecting the control input to a suitable AC source, the motor 13 is caused to rotate these irregular formed disks across the contacting face of contact pairs 28 and 29. As a wider portion of the disk, say as at 34, is gradually moved between the contact pairs to the position 37, the resistance between these contact pairs is gradually decreased to result in a gradual increase in the duty cycle rate of the duty cycle unit 14 and consequently a gradual brightening of a lighting source connected therewith. Further operation of the motor effects the gradual movement of a narrower or higher resistance portion of the disk as at 38, passing between the contacts to result in reducing the duty cycle rate of the unit 14 and consequently a dimming of a lighting source controlled thereby.

In FIG. 3 is shown the contacting surfaces of the contact fingers 28 and 29 as positioned for tracking differently across the resistance face of the disks 25. The different positioning of these contact members upon the resistance surface of the disks, approximately doubles the life of the resistance surface upon these disks. Further, since the current load across the resistor and contact fingers remains relatively low and the voltage regulation not critical, the graphite coating of these contact fingers will also extend the life of the resistance surface upon the disks.

In FIG. 5 is shown an alternate arrangement for fabricating the resistance disks 25. Here an insulating strip is first passed longitudinally beneath a plurality of spray nozzels to effect high and low density surfaces such as at 40 and 41 respectively upon the strip. The disk is thereafter punched from the strip.

FUG. 4 shows how the resistance coating upon the disks as being applied as by spraying or printing in varying densities about its surface such as a high density coating as at 42, a lower density coating as at 43 and a lower density coating as at 43. The arrangement of these various and differing density surfaces about the disk selectively determines the duty cycle rate of the unit connected therewith and the light output intensity of a connected lighting source. The gradual blending of these high and low density coatings determines the duty cycle output pattern of each unit and similarly the wave form of the light output pattern of a lighting source connected therewith.

While FIGS. 4 and 5 shows the resistance material as being removed from the center of the disk, it is understood that a groove cut through the resistance coating; such as in FIG. 3, may be used to electrically isolate the used from the unused resistance portions of the disks. Further, while it is shown herein that these high and low density and thustly varying resistance surfaces blend gradually into each other to produce a gradually changing waveform at each output, a most attractive affect can be produced by intermittently providing for a sharp cut-off point between these high and low density coatings.

The advantage of the control as herein shown is that it provides means for coordinating the operation of a number of independent lighting sources to produce and continuously maintain an overall lighting effect unobtainable by other forms of light controlling apparatus. Further by proper selection of the configuration and positioning of the disks 25, the respective light intensity output patterns between lighting sources connected respectively to the duty cycle outputs of the units may be programmed to be varying and overlapping in nature as apparent from the light intensity curve patterns 61, 62, 63, and 64 as shown in FIG. 7 and whereby the varying light intensity output throughout, say a lighted Christmas tree, will remain substantially constant while a continuous shimmering effect is maintained throughout the tree.

The duty cycle unit as shown by 14, 15, 16, and 17 shall be understood to mean any suitable type of solid state assembly wherein the resistance value of the RC or gaiting circuit resistor, determines the duty cycle output rate of the unit. Duty cycle shall be understood to mean the ratio between the portion of the AC cycle that the unit is "on" or conducting current to the "off" time of the cycle when "no" or relatively no current is being passed. These "on" and "off" intervals occur very rapidly with the relative duration of these intervals being controlled by the design of the gait or triggering circuit to the SCR, TRIAC and DIAC or such similar operating electronic elements of the unit circuitry. The duty cycle or "conducting" interval of the cycle as it relates to the "off" interval, determines the relative hearing and cooling time of the incandescent lamp filament and consequently the light intensity output of the lighting source.

While herein is shown a simple form of the device that is highly effective in its operation, it is understood that various modifications may be made therein without departing from the inventive concept shown.

What I therefore claim and desire to cover by letters patent is:

1. An ornamental lighting control including in combination a plurality of solid state duty cycle units having a common input and respectively variable duty cycle outputs, connector means respectively connected to each duty cycle output for connecting thereto an ornamental lighting source with the duty cycle of said output determining the light output intensity of a lighting source connected therewith, an RC gating circuit forming a respective part of each duty cycle unit and wherein the resistance value of the gating circuit resistor determines the duty cycle of the unit and output thereof, a resistance disk forming the gating circuit resistor in each RC circuit and including a resistance surface having differing resistance values for predetermined fixed distances across its surface, contact means electrically engaging the resistance surface of said disk and respectively connecting the resistance surface of the disk in the gating circuit of each duty cycle unit, motor means opperable to effect relative movement between said contact means and said resistance surface to apply predetermined random like resistance changes from said disk respectively to the gating circuit of each duty cycle unit to vary gradually and in predetermined random and in respectively differing order the duty cycle of each duty cycle unit whereby the light output intensity pattern of each lighting source respectively connected to the output of each duty cycle unit shall differ one from the other for a predetermined operating interval of said motor means.

2. An ornamental lighting control as called for in claim 1 wherein said contact means engages in predetermined spaced relation the resistance surface of said disk.

3. An ornamental lighting control as called for in claim 1 wherein the differing resistance values for differing fixed distances across the surface of the disk is effected by altering selectively the configuration of the disk.

4. An ornamental lighting control as called for in claim 1 wherein the said differing resistance values for differing fixed distances across the surface of the disk is effected by altering selectively the configuration of its resistance surface.

5. An ornamental lighting control as called for in claim 1 wherein the differing resistance values for differing fixed areas across the surface of the disk is effected by coating a nonconductive surface with a resistance material of differing densities as applied to the surface.

6. An ornamental lighting control as called for in claim 1 wherein the differing resistance values for differing fixed areas across the surface of the disk is effected by coating a nonconductive surface with materials of differing electrical resistance characteristics.

7. An ornamental lighting control as called for in claim 1 wherein the light intensity of any lighting source connected to a duty cycle output thereof is never reduced below an incandescent state.

8. An ornamental lighting control as called for in claim 1 wherein said light intensity changes between lighting sources is effected gradually.

9. An ornamental lighting control including in combination, a plurality of solid state duty cycle units having a common input and respectively variable duty cycle outputs, connector means respectively connected to each duty cycle output for connecting thereto an ornamental lighting source with the duty cycle of said output determining the light output intensity of a lighting source connected therewith, an RC gating circuit forming a respective part of each duty cycle unit and wherein the resistance value of the gating circuit resistor determines the duty cycle of the unit and output thereof, a resistance surface having differing resistance values for predetermined fixed distances across its surface forming the gating circuit resistor in each RC circuit, contact means electrically engaging said resistance surface and respectively connecting the resistance surface in the gating circuit of each duty cycle unit, motor means operative to effect relative movement between said contact means and resistance surface to apply predetermined random like resistance changes from said resistance surface respectively to the gating circuit of each duty cycle unit to vary gradually and in a predetermined random and in respectively differing order, the duty cycle rate of each duty cycle unit whereby the light output intensity pattern of each lighting sources respectively connected to each output differs from the other for a predetermined operating interval of said motor means.

10. An ornamental lighting control as called for in claim 9 wherein the said resistance surface having differing resistance values for differing fixed distances across its surface is effected by selectively altering the configuration of the resistance surface.

11. An ornamental lighting control as called for in claim 9 wherein the differing resistance values for differing fixed areas across the surface of the disk is effected by coating a nonconductive surface with a resistance material of differing densities as applied to the surface.

12. An ornamental lighting control as called for in claim 9 wherein the differing resistance values for differing fixed areas across the surface of the disk is effected by coating a nonconductive surface with materials of differing electrical resistance characteristics.

13. An ornamental lighting control as called for in claim 9 wherein the light intensity of any lighting source connected to a duty cycle output thereof is never reduced below an incandescent state.

14. An ornamental lighting control as called for in claim 9 wherein said light intensity changes between lighting sources is effected gradually.

15. An ornamental lighting control including in combination, a plurality of solid state duty cycle units having a common input and respectively variable duty cycle outputs, connector means respectively connected to each duty cycle output for connecting thereto an ornamental lighting source with the duty cycle of said output determining the light output intensity of a lighting source connected therewith, an RC gating circuit forming a respective part of each duty cycle unit and wherein the resistance value of the gating circuit resistor determines the duty cycle of the unit and output thereof, means respectively forming the gating circuit resistor in each RC circuit and including a resistance surface having differing resistance values for predetermined fixed distances across its surface, contact means electrically engaging said resistance surface and respectively connecting the resistance surface in the gating circuit of each duty cycle unit, motor means operative to effect relative movement between said contact means and said resistance surface to effect predetermined random like resistance changes from said resistance surface respectively to the gating circuit of each duty cycle unit to vary gradually and in a predetermined random and respectively differing order with respect to the other the duty cycle rate of each duty cycle unit whereby the light output intensity pattern of each lighting source respectively connected to each output of each duty cycle unit differs one from the other for a predetermined operating interval of said motor means.

16. An ornamental lighting control as called for in claim 15 wherein the resistance surface forming the gating circuit resistor in each RC circuit and having differing resistance values for predetermined fixed distances across its surface is effected by altering selectively the confiruration of the resistance surface.

17. An ornamental lighting control as called for in claim 15 wherein the differing resistance values for differing fixed areas across the resistance surface is effected by coating a nonconductive surface with a resistance material of differing densities as applied to the surface.

18. An ornamental lighting control as called for in claim 15 wherein the differing resistance values for differing fixed areas across the surface of the disk is effected by coating a nonconductive surface with materials of differing electrical resistance characteristics.

19. An ornamental lighting control as called for in claim 15 wherein the light intensity of any lighting source connected to a duty cycle output thereof is never reduced below an incavdescent state.

20. An ornamental lighting control as called for in claim 15 wherein said light intensity changes between lighting sources is effected gradually.

* * * * *